United States Patent
Chandra et al.

(10) Patent No.: US 9,690,834 B2
(45) Date of Patent: Jun. 27, 2017

(54) REPRESENTATION, COMPARISON, AND TROUBLESHOOTING OF NATIVE DATA BETWEEN ENVIRONMENTS

(71) Applicant: Siemens Product Lifecycle Management Software Inc., Plano, TX (US)

(72) Inventors: Basavaraju Chandra, Mason, OH (US); Srinivas Tennety, Cincinnati, OH (US); Ganesh Chormule, Maharashtra (IN)

(73) Assignee: SIEMENS PRODUCT LIFECYCLE MANAGEMENT SOFTWARE INC., Plano, TX (US)

( * ) Notice: Subject to any disclaimer, the term of this patent is extended or adjusted under 35 U.S.C. 154(b) by 34 days.

(21) Appl. No.: 14/636,966

(22) Filed: Mar. 3, 2015

(65) Prior Publication Data

US 2016/0154627 A1  Jun. 2, 2016

(30) Foreign Application Priority Data

Nov. 27, 2014  (IN) .......................... 1244/KOL/2014

(51) Int. Cl.
*G06F 9/44* (2006.01)
*G06F 7/00* (2006.01)
*G06F 17/30* (2006.01)

(52) U.S. Cl.
CPC .............................. *G06F 17/30569* (2013.01)

(58) Field of Classification Search
None
See application file for complete search history.

(56) References Cited

U.S. PATENT DOCUMENTS

| | | | | |
|---|---|---|---|---|
| 6,775,675 B1* | 8/2004 | Nwabueze | ........ | G06F 17/30554 707/600 |
| 7,661,103 B2* | 2/2010 | Hayward | .......... | G06F 17/30569 709/246 |
| 2002/0073236 A1* | 6/2002 | Helgeson | .......... | G06F 17/30569 709/246 |
| 2002/0143941 A1* | 10/2002 | Rich | ........................ | G06F 8/24 709/225 |
| 2003/0014617 A1* | 1/2003 | Tamboli | ............ | G06F 17/30569 713/1 |
| 2004/0006585 A1* | 1/2004 | Paulus | ................... | G06Q 10/10 709/200 |
| 2005/0160399 A1* | 7/2005 | Kumar | ..................... | G06F 8/36 717/104 |
| 2005/0235274 A1* | 10/2005 | Mamou | ................. | G06Q 10/10 717/136 |

(Continued)

*Primary Examiner* — Insun Kang

(57) ABSTRACT

Methods for data management and corresponding systems and computer-readable mediums. A method includes receiving first native data in a first native format associated with a first native application. The method includes converting and storing the first native data in a transfer format as first transfer data. The method includes parsing the first transfer data to produce first converted data, in a converted format, that corresponds to the first native data. The method includes building a first native application model, corresponding to the first native data, according to the first converted data. The method includes displaying the first native application model in a view corresponding to the first native application.

17 Claims, 12 Drawing Sheets

(56) References Cited

U.S. PATENT DOCUMENTS

| | | | |
|---|---|---|---|
| 2005/0262194 A1* | 11/2005 | Mamou | G06Q 10/10 |
| | | | 709/203 |
| 2006/0020931 A1* | 1/2006 | Clarke | G06Q 10/06 |
| | | | 717/138 |
| 2006/0089945 A1* | 4/2006 | Paval | G06F 17/30607 |
| 2008/0288889 A1* | 11/2008 | Hunt | G06Q 30/02 |
| | | | 715/810 |
| 2008/0294996 A1* | 11/2008 | Hunt | G06Q 30/02 |
| | | | 715/739 |
| 2009/0171974 A1* | 7/2009 | Arthursson | G06F 9/45504 |
| 2011/0225183 A1* | 9/2011 | Rezayat | G06Q 10/10 |
| | | | 707/769 |
| 2012/0005652 A1* | 1/2012 | Franke | H04L 69/08 |
| | | | 717/116 |
| 2012/0079367 A1* | 3/2012 | Carter | G06F 17/30905 |
| | | | 715/234 |
| 2012/0254828 A1* | 10/2012 | Aiylam | G06F 8/51 |
| | | | 717/104 |
| 2013/0318207 A1* | 11/2013 | Dotter | H04L 29/08117 |
| | | | 709/219 |
| 2014/0082586 A1* | 3/2014 | Casey | G06F 8/20 |
| | | | 717/104 |
| 2014/0250121 A1* | 9/2014 | Kieselbach | G06F 17/30595 |
| | | | 707/736 |
| 2014/0280755 A1* | 9/2014 | Memon | H04L 67/02 |
| | | | 709/219 |
| 2014/0358892 A1* | 12/2014 | Nizami | G06F 17/30864 |
| | | | 707/711 |
| 2015/0178327 A1* | 6/2015 | Cohen | G06F 17/3056 |
| | | | 707/603 |
| 2015/0326664 A1* | 11/2015 | Richter | H04L 67/1095 |
| | | | 709/217 |

\* cited by examiner

```
<administrationData
        categoryName="Charities"
        displayName="Category_Charities.displayName"
        description="Category_Charities.description"
        smallIcon="Icons/Charities_16.jpg"
        largeIcon="Icons/Charities_32.jpg">

<xmlObjectNames>                    ⟵ 602
            <primaryElement
                xmlName="S2Charity"
                singularDisplayName="S2Charity.singularDisplayName"
                pluralDisplayName="S2Charity.pluralDisplayName"
                smallIcon="Icons/S2Charity_16.jpg"
                largeIcon="Icons/S2Charity_32.jpg">
            </primaryElement>
                                            ⟵ 604
            <secondaryElement
                xmlName="S2Address"
                singularDisplayName="S2Address.singularDisplayName"
                smallIcon="Icons/S2Address_16.jpg"
                largeIcon="Icons/S2Address_32.jpg"/>
                                            ⟵ 606
            <secondaryElement
                xmlName="S2FinancialData"
                singularDisplayName="S2FinancialData.singularDisplayName"
                smallIcon="Icons/S2FinancialData_16.jpg"
                largeIcon="Icons/S2FinancialData_32.jpg"/>
        </xmlObjectNames>
</administrationData>
```

FIG. 7

```
<element xmlName="S2Charity">       ← 710
        <compoundProperty referencePropertyName="S2Address
702 →           sourceObject="S2Address" sourceObjectProperty="s2Street"/>
        <CompoundProperty referencePropertyName="s2Address"
                sourceObject="S2Address" sourceObjectProperty="s2State"/>
        <inlineProperty referencePropertyName="s2FinancialData">
704 →           <order propertyName="s2PrivateFunding"/>
                <order propertyName="s2TotalRevenue"/>
        </inlineProperty>
        <inlineProperty referencePropertyName="s2Volunteers">
                <order propertyName="s2Name"/>
                <order propertyName="s2age"/>
        </inlineProperty>
        <hideProperty>
706 →           <hide propertyName="s2Address"/>
        </hideProperty>
</element>
```

FIG. 8

Administrative Data | +

← file:///D:/wordir/projects/tc11/admindata/IDF/datareport/charities/SampleAdminDataReport/index.html    ▽ ☰ ▸ Google    🔍  ☆ 自  ⇨  ⇦  ≡

Most Visited ☐ Getting Started

| Categories | Charities |
|---|---|
| Summary | ◦ Catholic Charities USA |
| Glossary | ◦ Salvation Army |
| ⚙ Charities | ◦ Startup Charity |
|  | ◦ United Way |

TEAMCENTER                                            Administration Data                     Env ID: 100001
Release Teamcenter P1000.1.0.20131016.00                  Charities:                              Env Name: Site A ⚙ Charity : Catholic Charities USA A charity organization is a type of non-profit organization (NPO). It differs from other types of NPOs in that it centers on non-profit and philanthropic goals as well as social well-being, e.g. charitable, educational, religious, or other activities serving the public interest or common good.

↙ 802

Properties

Volunteers: <u>Name</u>   <u>Age</u>
           ◦ Mike   80
           ◦ Mike   60

Category: Domestic Needs
Name: Catholic Charities USA
Financial Data: <u>Private Funding</u>   <u>Total Revenue</u>
                 $1.607M              $4,600

↙ 804

Street: 33 33rd Ave
State: California

Copyright 2013 Siemens Product Lifecycle Management Software Inc. All Rights reserved
This documentation is proprietary and confidential to Siemens Product Lifecycle Management Software Inc.

REPRESENTATION, COMPARISON, AND TROUBLESHOOTING OF NATIVE DATA BETWEEN ENVIRONMENTS

CROSS-REFERENCE TO RELATED APPLICATION

This application claims the benefit of the filing date of India Patent Application 1244/KOL/2014, filed Nov. 27, 2014, which is hereby incorporated by reference.

TECHNICAL FIELD

The present disclosure is directed, in general, to computer-aided design, visualization, and manufacturing systems, product lifecycle management ("PLM") systems, and similar systems, that manage data for products and other items (collectively, "Product Data Management" systems or PDM systems).

BACKGROUND OF THE DISCLOSURE

PDM systems manage PLM and other data. Improved systems are desirable.

SUMMARY OF THE DISCLOSURE

Various disclosed embodiments include methods for data management and corresponding systems and computer-readable mediums. A method includes receiving first native data in a first native format associated with a first native application. The method includes converting and storing the first native data in a transfer format as first transfer data. The method includes parsing the first transfer data to produce first converted data, in a converted format, that corresponds to the first native data. The method includes building a first native application model, corresponding to the first native data, according to the first converted data. The method includes displaying the first native application model in a view corresponding to the first native application.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 5 illustrates an example of viewing the raw native data without applying the domain knowledge;

FIG. 6 illustrates configuring primary and secondary elements in accordance with disclosed embodiments;

FIG. 7 illustrates display configuration options in accordance with disclosed embodiments;

FIG. 8 illustrates an exemplary data report in accordance with disclosed embodiments;

FIG. 9 illustrates comparing native data in tools without applying the domain knowledge;

FIG. 10 illustrates a compare report generated from the native model of the two environments in accordance with disclosed embodiments;

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

In an enterprise product containing a suite of applications, the application configuration data, administrative data, such as the Teamcenter software product by Siemens Product Lifecycle Management Software Inc., product configuration and product platform specification data could be represented in various native data formats such as DB, XML, OS data formats, plain text files, or others etc. These applications add domain specific knowledge into the presentation layer of the application to appropriately show the native data to the user as per the requirements of the application domain. In the applications that support the replication of data between environments, it is difficult and expensive to develop tools to determine differences between environments and to review those differences in application format outside the application. It is further complex to develop tools to represent in application format, the evolution of data between environments due to the data exchange and the impact of merge decisions.

Disclosed embodiments can manipulate and present domain-specific knowledge in the native data representation. Disclosed embodiments can also provide a visual presentation of a three-point merge used to synchronize the data changes between the sites involved in a data exchange, where a first site can intelligently and selectively merge data updates received from multiple other sites. One non-limiting example of such a merge process is described in U.S. patent application Ser. No. 14/328,358, filed Jul. 10, 2014, hereby incorporated by reference. With the visual representation, the user can see how the data got transformed or updated during the transfer from other sites and troubleshoot any issues post-merge.

Figure 1:
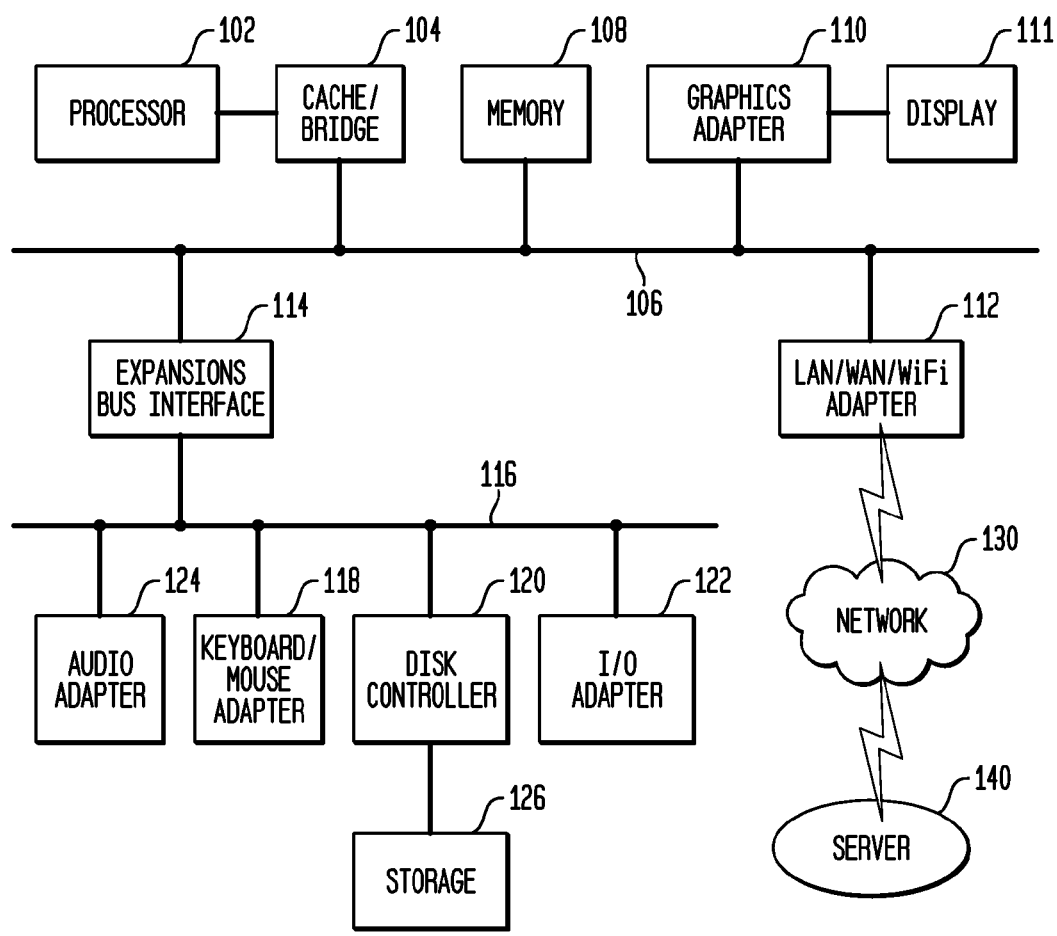
FIG. 1 illustrates a block diagram of a data processing system in which an embodiment can be implemented.

FIG. 1 illustrates a block diagram of a data processing system in which an embodiment can be implemented, for example as a PDM system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Disclosed embodiments can capture the domain knowledge required to represent native data through configuration extension. The configuration options in contrast to "style sheets" do not just specify the display style of the objects but drive the operations of comparing native data and troubleshooting issues. The codeless configuration options provide the ability to group properties together, hide properties, skip properties from comparison or display properties as a table. If the codeless configuration options do not satisfy the application's presentation requirements for a particular object then a generic code-full extension may be configured and implemented for that particular object. For all others, the codeless configuration options will be applied.

The native data of any type is parsed with its native parser to load to a native memory model. On this memory model the extensions are applied by the framework to reconstitute the native model with domain specific knowledge. The reconstituted native model can be used for generation of HTML based reports in the application format to compare and troubleshoot issues. The HTML files are easy to use, have low system requirements and also can be transferred and viewed from environments that are not connected to the application. The data reports provide the ability to view the data outside of the application in the application format. The compare reports provide the ability to compare native data between environments and the import history reports provide the visual representation of a three point merge which helps in troubleshooting any merge issues due to data exchange from other environments.

In an enterprise application, like the Teamcenter software product, the native data could be stored in database, XML, plain text files or any other native format. The presentation layer of the respective applications process the native data and format the display of the data according to some rules and styles developed by the experts of the application to present the data in the best possible way. Disclosed embodiments can capture the domain specific knowledge of display rules and styles in the form of configuration options to display the data outside of the application in the application format.

The system parses the native data of any type with its native data parser to load the data in to a memory model. On this memory model the extensions are applied by the framework to obtain a reconstituted native model. The reconstituted native model is used to generate HTML based reports to view the native data in the application format in a disconnected environment, compare data between two environments and troubleshoot the issues related to merging of data.

Disclosed embodiments can create lightweight HTML-based reports that provide a representation of native data in the application's format outside of the application. These reports are more efficient and require less memory and compute power than creating a true replica of the application's user interface.

Figure 2:
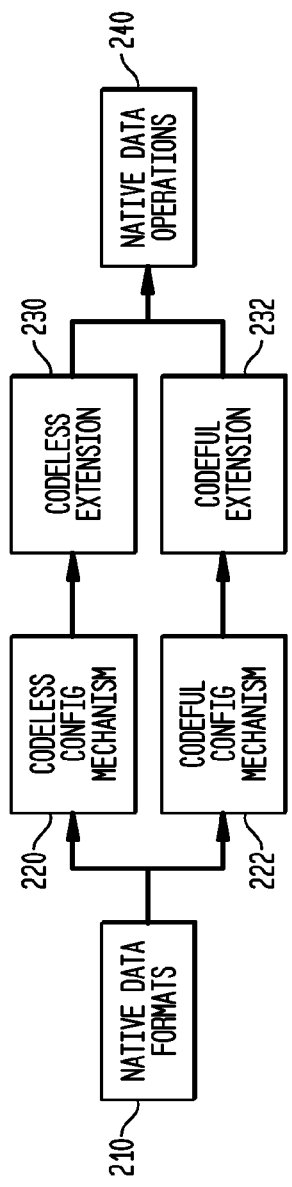
FIG. 2 illustrates a block diagram of elements according to disclosed embodiments.

FIG. 2 illustrates a block diagram of elements according to disclosed embodiments. In this case, native data formats 210 are read by the system using either a codeless configuration mechanism 220 or a codeful configuration mechanism 222. When read by the codeless configuration mechanism 220, the native data formats 210 are processed by codeless extension 230 to perform native data operations 240, such as viewing, comparing, or troubleshooting the native data. When read by the codeful configuration mechanism 222, the native data formats 210 are processed by codeful extension 232 to perform native data operations 240.

The codeful configuration mechanism 222 and the options described below can configure the display of native data.

To configure native data, the system defines its element types. The codeful configuration mechanism 222 defines two types of elements: primary elements and secondary elements. A primary element is an element that can exist by itself in the data. A primary element is a singular entity which does not require the presence of any other element in the data. A secondary element is an element that cannot exist by itself in the data and always requires the presence of some other element, usually a primary element in the data.

The elements of any native data can be categorized in to these two kinds of elements. For example, consider a real world scenario of an education department with teachers and students. A department can be considered as a primary element as it can exist by itself with or without enrollment of students. A student on the other hand is always associated with a department.

A set of primary and secondary elements can be grouped in to a category. The native data of an application can be all considered to be part of one category or logically divided in to different categories.

Codeless configuration options include options for displaying and comparing elements of the native data. The display configuration options control how the primary and secondary elements of a category are presented. The configuration options that can be specified to format the display include a property group that can be used to group a list of properties together. The order in which the properties are specified in the property group configuration is honored while displaying the properties. The configuration options that can be specified to format the display include hidden properties. The properties of the object that are internal to the application and should not be displayed to the user can be specified as hidden properties. These properties will not be displayed in the HTML reports. The configuration options that can be specified to format the display include a tree structure. If tree structure is specified on a reference property of an object, then the object being referred to is presented a child to the referring object.

By default the referencing properties, i.e., properties that point to some other primary or secondary object, are displayed with the link pointing to the referenced object on the referencing object. Disclosed embodiments can include two options to override this default behavior. The inline property configuration can be used to display the properties of the referenced objects as a table on the referring object. The compound property can be used to configure a property of the referenced object to be displayed directly on the referring object as if it belongs to the referring object.

The compare configuration options control how the primary and secondary elements of a category are compared. These can include a skip property configuration. The properties of an object that need to be skipped during comparison of objects can be specified using the skip property configuration.

Code-full configuration options can include property value display configuration option and a report design configuration option. The property value display configuration option provides the ability to specify a java class that provides the HTML content that needs to be displayed for a property. The java class would implement, for example, a PropertyValueDisplayBuilder interface provided by the system. The method buildPropertyValueDisplay would return the HTML content.

The report design configuration option can be used to specify a custom report design. If the report structure and pages generated by the framework do not suffice the requirements of an application then a special custom report design can be configured and implemented. The special report design class can be implemented, for example, as an "AdminReportDesign" interface and can be registered in a configuration xml file.

A first example of the operation of disclosed embodiments includes charities with addresses, financial data, and volunteers.

Figure 3:
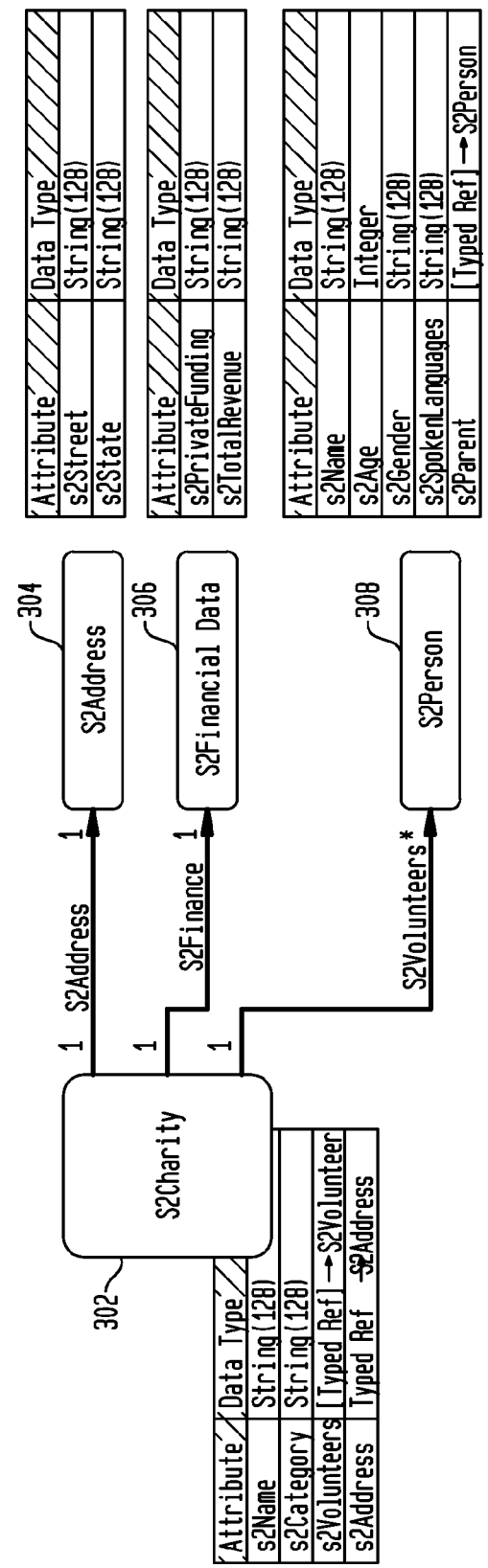
FIG. 3 illustrates a data model in accordance with a use case example.

FIG. 3 illustrates a data model in accordance with a use case example, including the details of charities 302, addresses 304, financial data 306 and person objects 308.

Figure 4:
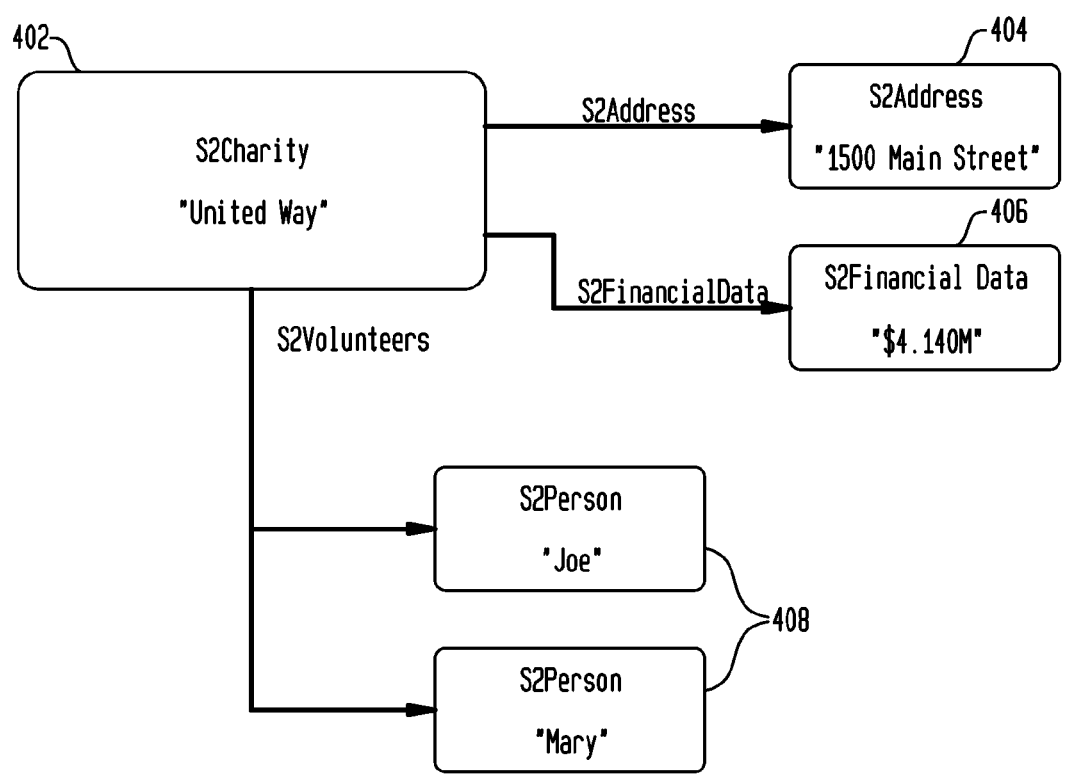
FIG. 4 illustrates an instance diagram in accordance with a use case example.

FIG. 4 illustrates an instance diagram in accordance with a use case example, including charity 402, address 404, financial data 406 and person objects 408.

If the "Charities" data stored as XML is viewed in the INTERNET EXPLORER browser software or text editor, one can only view the raw data. By viewing just the raw data it is difficult to visualize how each object is connected to the other. Only with difficulty, the number of instances of charities, the volunteers in each charity can be determined. In order to determine the address or financial data, first the reference properties values for them needs to noted down for a charity and then the whole XML file need to be searched to identify the address or financial data. The complexity of this task increases immensely with the size of the file.

Figure 5:
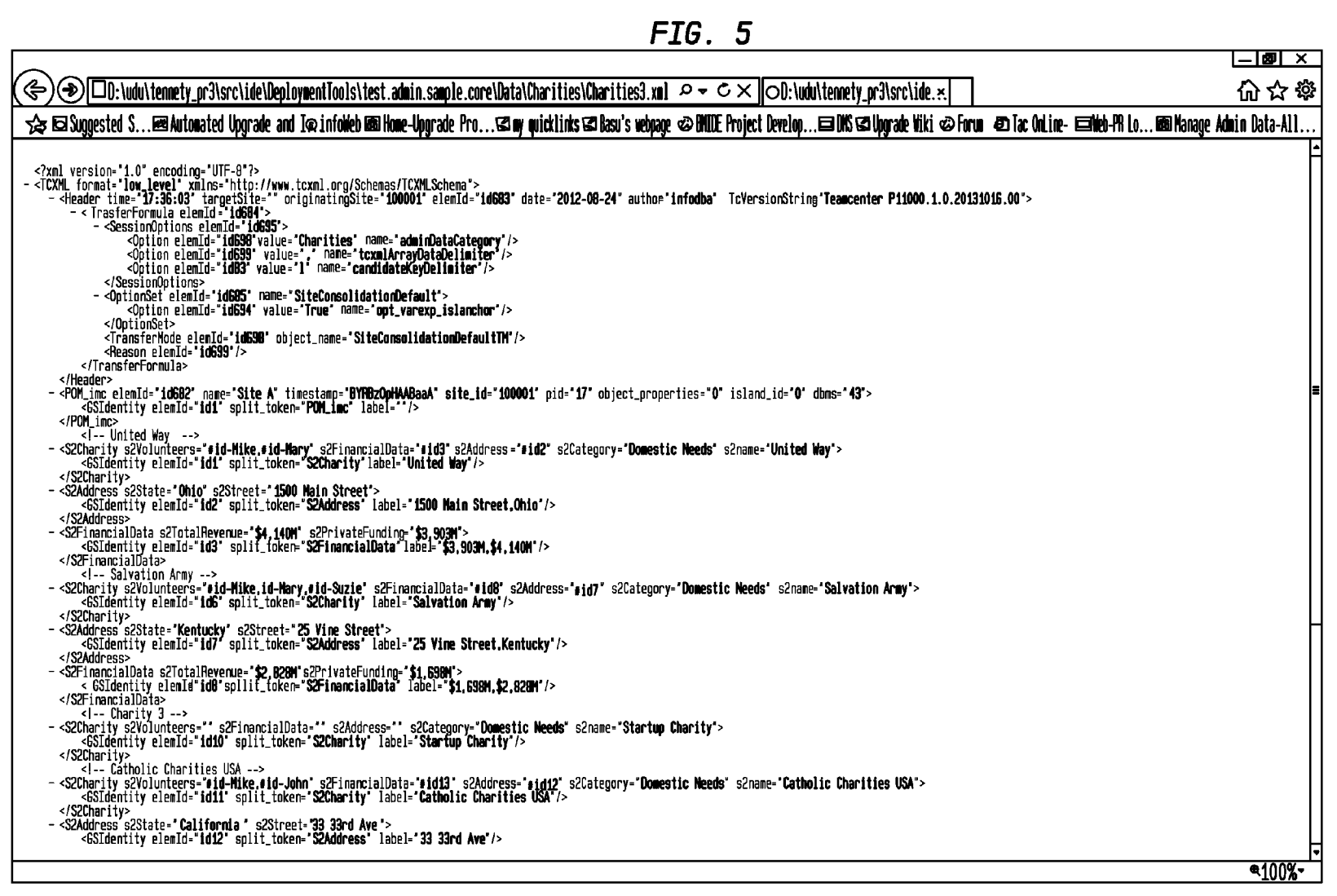

FIG. 5 illustrates an example of viewing the raw native data without applying the domain knowledge.

The following is an example of configuring the display of the "Charities" data according to disclosed embodiments and generating a report that is easier for users to navigate and view.

FIG. 6 illustrates configuring primary and secondary elements. This figure shows a simple real world example of a charity with address and financial data and how they can be configured using the framework. This configuration tells the system there are two object types that occur in this category. This figure illustrates a definition for a primary element 602 for the charity and definitions for secondary elements 604 and 606 for the address and financial data, respectively. For each element, the configuration includes large and small icons and a singular display name. The charity also includes a plural display name. Note there is no configuration needed to connect the S2Charity to the S2Address or S2FinancialData. This is handled automatically by the system because it will get this information from the data model definition of the object.

FIG. 7 illustrates display configuration options 700. The display configuration options control how the primary elements and secondary elements of a category are presented.

By using the <compoundProperty> 702, the configuration specifies the framework to traverse across the s2Address reference property to the source object (S2Address) and display s2Street and s2State properties on the S2Charity object page.

S2Volunteer object's properties name and age are configured as <inlineProperty> 704 to show them in a table.

Since the two properties on the S2Address object are displayed on the S2Charity page, a user or developer can choose not to display the S2Charities' reference property "s2Address" on the S2Charity page. The system can use a <hideProperty> tag 706 to hide this property. Properties 702, 704, and 706 are non-limiting examples of properties of configuration options that can be used, and others can be used as appropriate to modify the display. Properties 702, 704, and 706, in this example, are part of a property group 710.

FIG. 8 illustrates an exemplary data report in accordance with disclosed embodiments, according to the example presented, with display styles applied. Comparing FIG. 8 with FIG. 5 illustrates that the data report generated from the native model in accordance with disclosed embodiments is easier to navigate and it is easier to find the financial, volunteer and address information.

The report shows all the charities objects as a list for easy navigation. The report shows an inline table 802 for volunteers' information right on the charities page. Note that the Charity page now displays both the "Street" and "State" on its own page 804 as if they were defined on the Charity object. Also note that the "Address" property is no longer displayed on the Charity page.

Figure 9:
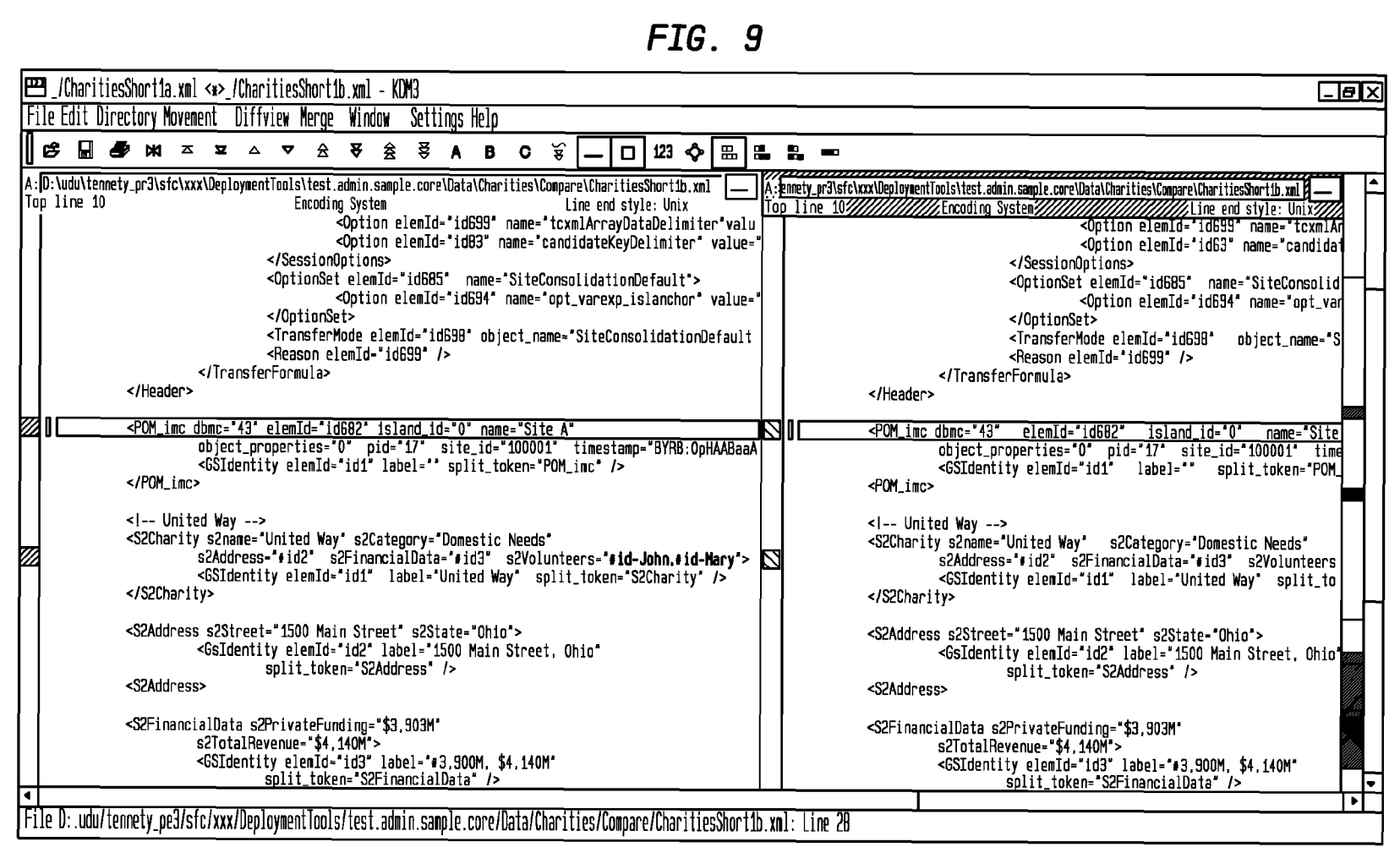

FIG. 9 illustrates comparing native data in tools without applying the domain knowledge. This example shows the raw comparison of native data in a program such as the Kdiff3 comparison tool without application of domain knowledge. The user can merely see the changes in the files without proper context. It is tedious and difficult to determine and visualize exactly what the changes are.

Figure 10:
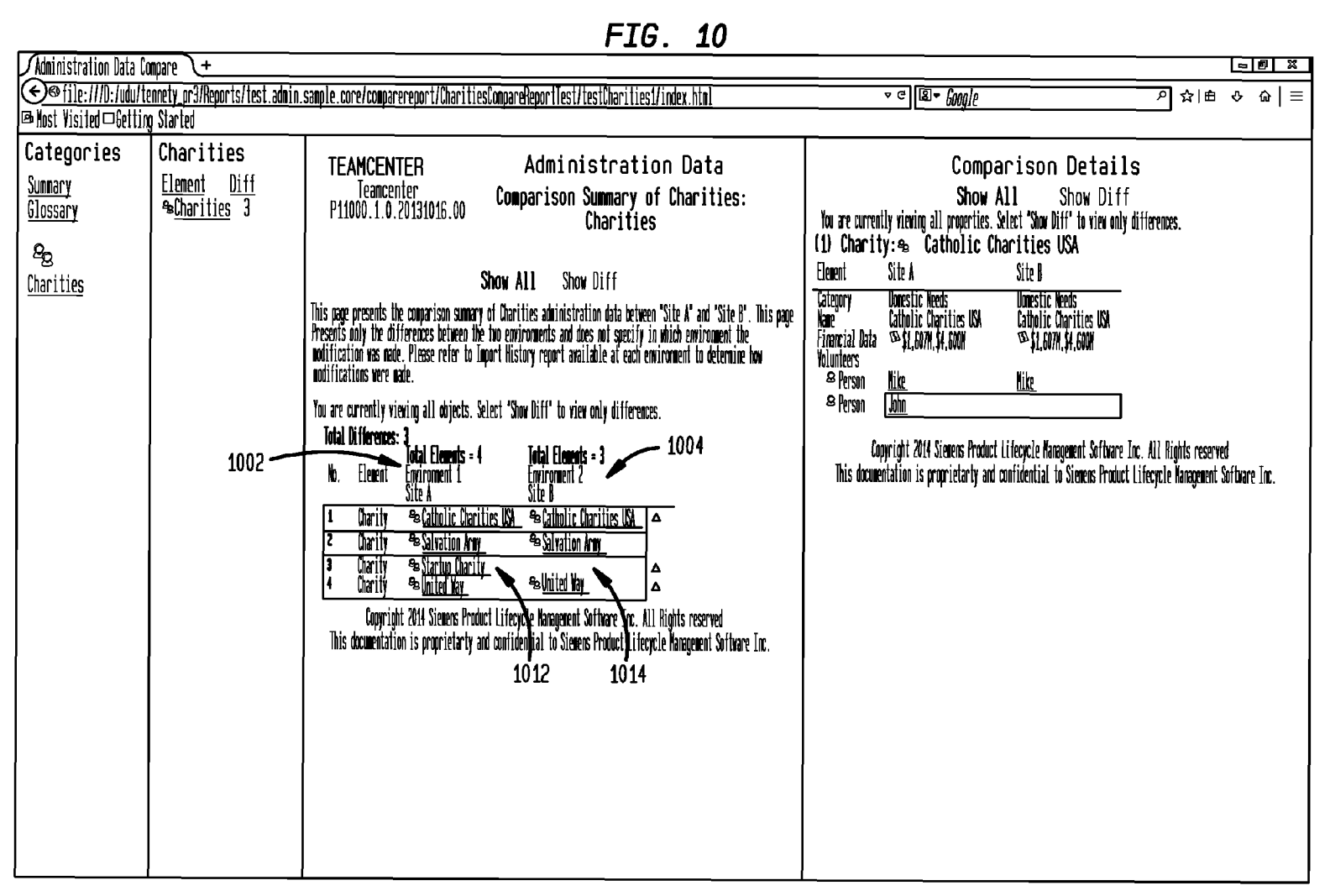

FIG. 10 illustrates a compare report generated from the native model of the two environments in accordance with disclosed embodiments. With the application of the configuration extensions, it can be clearly seen how many objects differ between the two environments and what the differences are. This example shows differences between environment 1 1002 and environment 2 1004. In this example, "Startup Charity" 1012 in environment 1 1002 is missing from environment 2 1004, as illustrated by the blank at 1014.

Figure 11:
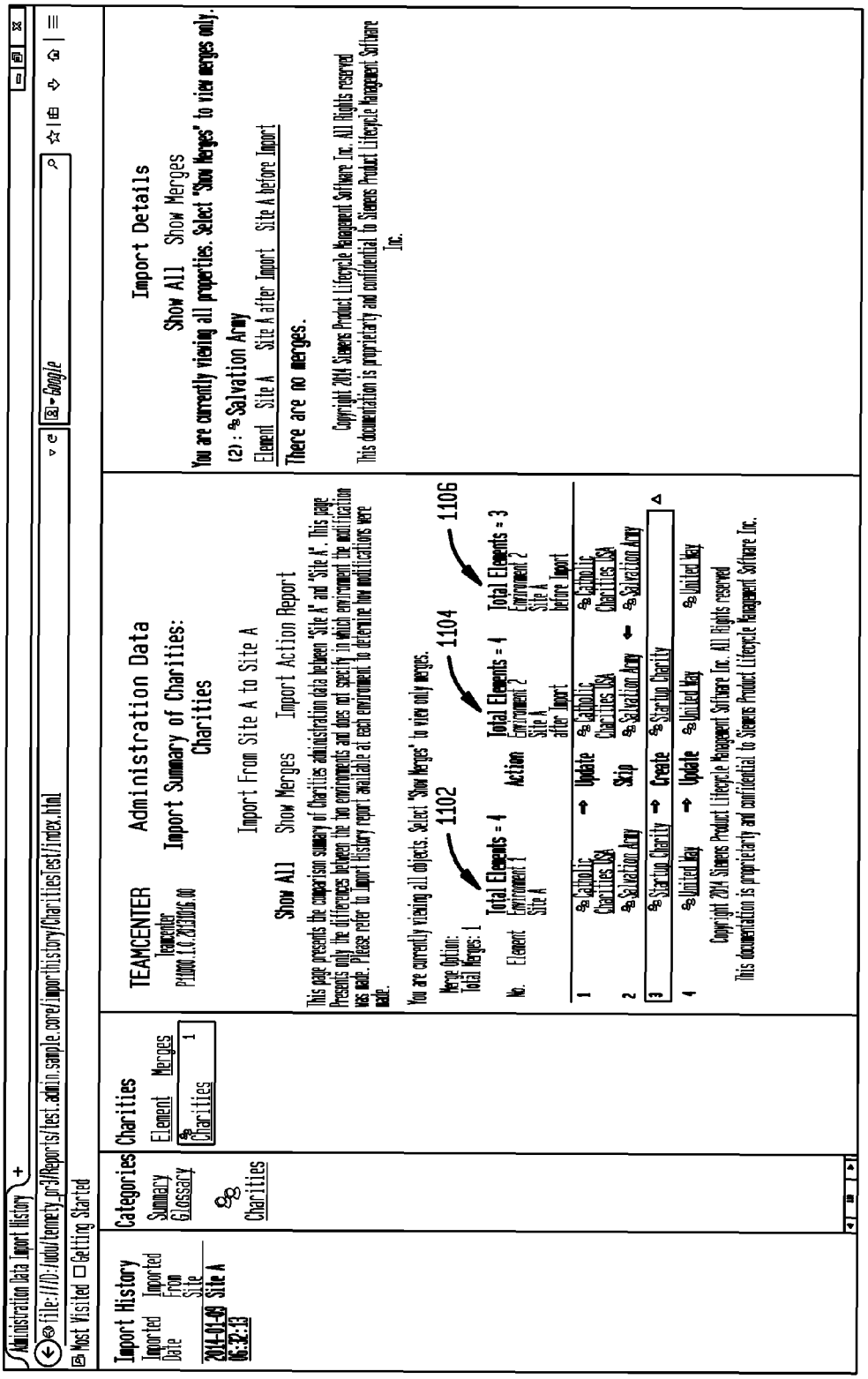
FIG. 11 illustrates an example of an import history report for troubleshooting data in accordance with disclosed embodiments.

FIG. 11 illustrates an example of an import history report for troubleshooting data in accordance with disclosed embodiments. Disclosed embodiments provide an import history report as a visualization tool for three point merge processes used to synchronize the data changes between the sites involved in a data exchange. The import history report tracks the imports in an environment from various sites and the respective import dates. It shows a summary of data that was merged, the three point merge decision and the data in the environment before and after merge. In this example, the report shows the state of environment 1 at 1102, in contrast with environment 2 after import at 1104 and environment 2 before import at 1106. With this report, an administrator can troubleshoot any issues that may arise during import from other environments. Since, the data before import is shown, the administrator can revert back to that value if needed.

Figure 12:
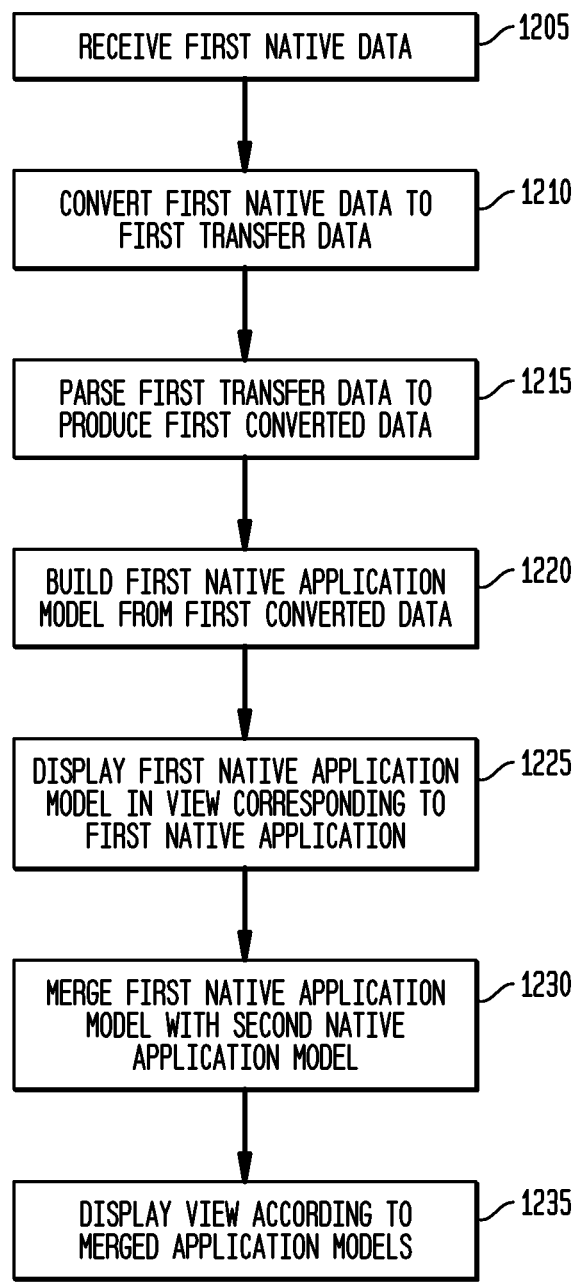
FIG. 12 illustrates a flowchart of a process in accordance with disclosed embodiments.
Figure 13:
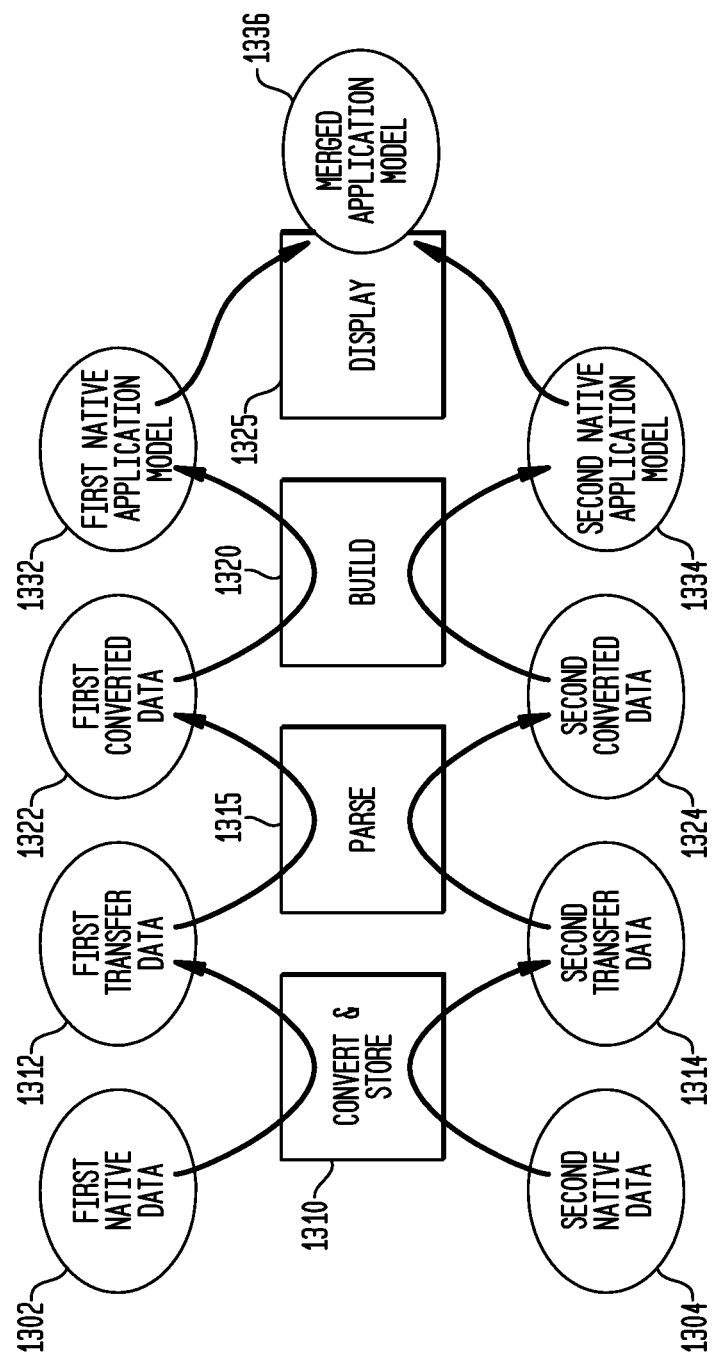
FIG. 13 illustrates elements of a process as in FIG. 12, and is used to illustrate such a process.

FIG. 12 illustrates a flowchart of a process in accordance with disclosed embodiments that may be performed, for example, by a PLM or PDM system. Such a system can be implemented, for example as a data processing system 100, and is referred to generically as the "system" below. FIG. 13 illustrates elements of a process as in FIG. 12, and is used to illustrate such a process.

The system receives first native data in a first native format associated with a first native application (1205). Receiving, as used herein, can include loading from storage, receiving from another device or process, receiving via an interaction with a user, or otherwise. "Native," in this context, refers to data as produced and stored in a proprietary or open format that is associated with one or more specific applications.

The system converts and stores the first native data in a transfer format as first transfer data (1210). The "transfer format," in this context, refers to a format that can be parsed and interpreted by the system without use of the first native application. The first transfer data corresponds to the first native data. This step can include reading metadata associated with the first native data and using the metadata to convert the first native data to the first transfer data. The first transfer data can be stored as transfer inport/export files. In the example of FIG. 13, first native data 1302 is converted and stored, at 1310, into first transfer data 1312. In a separate process, second native data 1304 can be converted and stored, at 1310, into second transfer data 1314.

The system parses the first transfer data to produce first converted data, in a converted format, that corresponds to the first native data (1215). The "converted format," in this context, refers to a common data format into which data from multiple different native formats can be converted. This process can include identifying and grouping primary and secondary data elements in the native data, applying configuration options and properties to the native data, and performing other processes as described herein. The first converted data can be stored as an in-memory generic data model. In the example of FIG. 13, first transfer data 1312 is parsed, at 1315, into first converted data 1322. In a separate process, second transfer data 1314 can be parsed, at 1315, into second converted data 1324.

The system builds a first native application model, corresponding to the first native data, according to the converted data (1220). The first native application model can be stored in the first native format. This step can include transforming the in-memory generic data model according to the first application format to build the native application model. In the example of FIG. 13, first converted data 1322 is built, at 1320, into first native application model 1332. In a separate process, second converted data 1324 is built, at 1320, into second native application model 1334.

The system can display the first native application model in a view corresponding to the first native application (1225). That is, the native application model that corresponds to the first native data is displayed in a view that is substantially similar to how the native data would have appeared in the native application. The display can be, for example, a display of all of the native application model, or otherwise. The display can be based on the identified primary and secondary data elements, on the configuration options, on the properties or property groups, on defined default behaviors, or other features as described herein. In the example of FIG. 13, first native application model 1332 is displayed in a view at 1325. In a separate process, second native application model 1334 can be displayed in a view at 1325.

The system can perform optional processes to combine or compare data from different native applications.

The system can merge the first native application model with a second native application model that was produced from second native data in a second native format to produce a merged application model (1230). The merge can be performed as a three-point merge as described herein that selectively combines data from different data processing systems or applications. The first and second native application models data can be from different systems, from different applications on the same system, or otherwise. In the example of FIG. 13, first native application model 1332 can be merged with second native application model 1334.

The system can display a view of the merged application model, for example in a format corresponding to the first application (1235). This can be, for example, a view of a selected portion of the merged application model, a comparison of the first native application model to the merged application model, a display of conflicts between the first native application model and the merged application model, or otherwise. The display can be based on the identified primary and secondary data elements, on the configuration options, on the properties or property groups, on defined default behaviors, or other features as described herein. In the example of FIG. 13, this can be a display of merged application model 1336.

Of course, those of skill in the art will recognize that, unless specifically indicated or required by the sequence of operations, certain steps in the processes described above may be omitted, performed concurrently or sequentially, or performed in a different order. The features described above can be combined in any number of ways in different embodiments.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke 35 USC §112(f) unless the exact words "means for" are followed by a participle.

What is claimed is:

1. A method for data management, the method performed by a data processing system and comprising:

receiving first native data in a first native format associated with a first native application;

receiving second native data in a second native format associated with a second native application;

converting and storing the first native data in a first transfer format as first transfer data based on metadata associated with the first native data;

converting and storing the second native data in a second transfer format as second transfer data based on metadata associated with the second native data;

parsing the first transfer data by identifying and grouping primary and secondary data elements in the first native data in order to produce first converted data, in a first converted format, that corresponds to the first native data, and which the first converted format is different than the first transfer format via the first converted format classifying all of data elements of the first native data as each being either a primary or a secondary data element, wherein the first converted data includes both primary and secondary data elements, wherein the primary data elements are identified as corresponding to elements in the first transfer data that can exist by themselves in the first transfer data and that do not require the presence of other elements in the first transfer data, wherein the secondary data elements are identified as corresponding to elements in the first transfer data that cannot exist by themselves in the first transfer data and that do require the presence of other elements in the first transfer data;

parsing the second transfer data by identifying and grouping primary and secondary data elements in the second native data in order to produce second converted data, in a second converted format, that corresponds to the second native data, and which the second converted format is different than the second transfer format via the second converted format classifying all of data elements of the second native data as each being either a primary data element or a secondary data element, wherein the second converted data includes both primary and secondary data elements, wherein the primary data elements are identified as corresponding to elements of the second transfer format that can exist by themselves in the second transfer data and that do not require the presence of other elements in the second transfer data, wherein the secondary data elements are identified as corresponding to elements in the second transfer data that cannot exist by themselves in the second transfer data and that do require the presence of other elements in the second transfer data;

building a first native application model, corresponding to the first native data, according to the produced first converted data;

building a second native application model, corresponding to the second native data, according to the produced second converted data;

comparing the first native application model with the second native application model to produce a merged application model based on the primary and secondary data element classifications; and displaying a view of the produced merged application model.

2. The method of claim 1, wherein the displaying is based on display configuration options including a hide property.

3. The method of claim 1, wherein the primary and secondary data elements are labeled via primary and secondary XML tags in the first and second converted data.

4. The method of claim 1, wherein comparing the first native application model with the second native application model to produce the merged application model is based on a compare configuration that includes options for how to control comparing the primary and the secondary elements between the first and second converted data, including a skip property configuration that specifies an element that is skipped during the comparison.

5. The method of claim 4, wherein producing the merged application model is based on a three-point merge that selectively combines data from different data processing systems.

6. The method of claim 1, wherein the view of the merged application model is one of a comparison of the first native application model to the merged application model or a display of conflicts between the first native application model and the merged application model.

7. A data processing system comprising:

a processor; and an accessible memory, the data processing system particularly configured to receive first native data in a first native format associated with a first native application;

receive second native data in a second native format associated with a second native application;

convert and store the first native data in a first transfer format as first transfer data based on metadata associated with the first native data;

convert and store the second native data in a second transfer format as second transfer data based on metadata associated with the second native data;

parse the first transfer data by identifying and grouping primary and secondary data elements in the first native data in order to produce first converted data, in a first converted format, that corresponds to the first native data, and which the first converted format is different than the first transfer format via the first converted format classifying all of data elements of the first native data as each being either a primary or a secondary data element, wherein the first converted data includes both primary and secondary data elements, wherein the primary data elements are identified as corresponding to elements in the first transfer data that can exist by themselves in the first transfer data and that do not require the presence of other elements in the first transfer data, wherein the secondary data elements are identified as corresponding to elements in the first transfer data that cannot exist by themselves in the first transfer data and that do require the presence of other elements in the first transfer data;

parse the second transfer data by identifying and grouping primary and secondary data elements in the second native data in order to produce second converted data, in a second converted format, that corresponds to the second native data, and which the second converted format is different than the second transfer format via the second converted format classifying all of data elements of the second native data as each being either a primary data element or a secondary data element, wherein the second converted data includes both primary and secondary data elements, wherein the primary data elements are identified as corresponding to elements of the second transfer format that can exist by themselves in the second transfer data and that do not require the presence of other elements in the second transfer data, wherein the secondary data elements are identified as corresponding to elements in the second transfer data that cannot exist by themselves in the second transfer data and that do require the presence of other elements in the second transfer data;

build a first native application model, corresponding to the first native data, according to the produced first converted data;

build a second native application model, corresponding to the second native data, according to the produced second converted data;

compare the first native application model with the second native application model to produce a merged application model based on the primary and secondary data element classifications; and display a view of the produced merged application model.

8. The data processing system of claim 7, wherein the display is based on display configuration options including a hide property.

9. The data processing system of claim 7, wherein the primary and secondary data elements are labeled via primary and secondary XML tags in each of the first and second converted data.

10. The data processing system of claim 8, wherein the compare of the first native application model with the second native application model to produce the merged application model is based on a compare configuration that includes options for how to control comparing the primary and the secondary elements between the first and second converted data, including a skip property configuration that specifies an element that is skipped during the comparison.

11. The data processing system of claim 10, wherein producing the merged application model is based on a three-point merge that selectively combines data from different data processing systems.

12. The data processing system of claim 7, wherein the view of the merged application model is one of a comparison of the first native application model to the merged application model or a display of conflicts between the first native application model and the merged application model.

13. A non-transitory computer-readable medium encoded with executable instructions that, when executed, cause one or more data processing systems to:

receive first native data in a first native format associated with a first native application;

receive second native data in a second native format associated with a second native application;

convert and storing the first native data in a first transfer format as first transfer data based on metadata associated with the first native data;

convert and store the second native data in a second transfer format as second transfer data based on metadata associated with the second native data;

parse the first transfer data by identifying and grouping primary and secondary data elements in the first native data in order to produce first converted data, in a first converted format, that corresponds to the first native data, and which the first converted format is different than the first transfer format via the first converted format classifying all of data elements of the first native data as each being either a primary or a secondary data element, wherein the first converted data includes both primary and secondary data elements, wherein the primary data elements are identified as corresponding to elements in the first transfer data that can exist by themselves in the first transfer data and that do not require the presence of other elements in the first transfer data, wherein the secondary data elements are identified as corresponding to elements in the first transfer data that cannot exist by themselves in the first transfer data and that do require the presence of other elements in the first transfer data;

parse the second transfer data by identifying and grouping primary and secondary data elements in the second native data in order to produce second converted data, in a second converted format, that corresponds to the second native data, and which the second converted format is different than the second transfer format via the second converted format classifying all of data elements of the second native data as each being either a primary data element or a secondary data element, wherein the second converted data includes both primary and secondary data elements, wherein the primary data elements are identified as corresponding to elements of the second transfer format that can exist by themselves in the second transfer data and that do not require the presence of other elements in the second transfer data, wherein the secondary data elements are identified as corresponding to elements in the second transfer data that cannot exist by themselves in the second transfer data and that do require the presence of other elements in the second transfer data;

build a first native application model, corresponding to the first native data, according to the produced first converted data;

build a second native application model, corresponding to the second native data, according to the produced second converted data;

compare the first native application model with the second native application model to produce a merged application model based on the primary and secondary data element classifications; and display a view of the produced merged application model.

14. The computer-readable medium of claim 13, wherein the display is based on display configuration options including a hide property.

15. The computer-readable medium of claim 13, wherein the primary and secondary data elements are labeled via primary and secondary XML tags in the first and second converted data.

16. The computer-readable medium of claim 13, wherein the compare of the first native application model with the second native application model to produce the merged application model is based on a compare configuration that includes options for how to control comparing the primary and the secondary elements between the first and second converted data, including a skip property configuration that specifies an element that is skipped during the comparison.

17. The computer-readable medium of claim 13, wherein producing the merged application model is based on a three-point merge that selectively combines data from different data processing systems, and wherein the view of the merged application model is one of a comparison of the first native application model to the merged application model or a display of conflicts between the first native application model and the merged application model.

* * * * *